2,886,594
Patented May 12, 1959

2,886,594

N-(2-CARBAMYLALKYL)-ARALKYLAMINES

Alexander R. Surrey, Albany, N.Y., assignor to Sterling Drug Inc., New York, N.Y., a corporation of Delaware No Drawing. Original application December 27, 1954, Serial No. 477,935, now Patent No. 2,776,991, dated January 8, 1957. Divided and this application September 29, 1955, Serial No. 537,552

6 Claims. (Cl. 260—558)

This invention relates to certain N-(2-carbamylalkyl)-(substituted-phenyl)alkylamines used for example as intermediates in the preparation of preferred embodiments of my copending application Serial No. 477,935 (filed December 27, 1954; now U.S. Patent 2,776,991, issued January 8, 1957), of which this application is a division.

The N - aralkyl-N-(2-carbamylalkyl)-halogenated-alkanamides which are disclosed and claimed in U.S. Patent 2,776,991 have the general formula

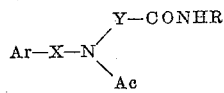

where Ar is a member selected from the group consisting of phenyl, naphthyl, biphenylyl, furyl, pyridyl and thienyl radicals, X is a lower alkylene radical having from one to four carbon atoms, Y is a lower alpha,beta-alkylene radical having from two to four carbon atoms, R is a member selected from the group consisting of hydrogen and a hydrocarbyl radical having from one to eight carbon atoms, and Ac is a halogenated-(lower alkanoyl) radical having from two to four carbon atoms. Chemotherapeutic evaluation of these compounds has shown them to possess amebacidal activity.

The lower alkylene radical X has from one to four carbon atoms, and includes such examples as

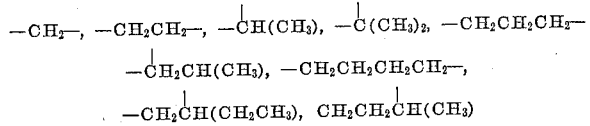

and the like

The lower alpha,beta-alkylene radical Y has from two to four carbon atoms, and includes such examples as

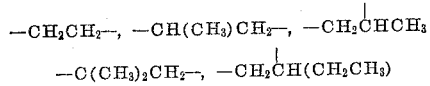

and the like.

The hydrocarbyl radical R has from one to eight carbon atoms, and can be alkyl, alkenyl, cycloalkyl, cycloalkylalkyl, phenyl, alkylated-phenyl, benzyl or phenethyl, and includes such examples as: methyl, ethyl, n-propyl, isopropyl, 2-butyl, isoamyl, n-hexyl, and the like, when alkyl; 2-propenyl, 3-butenyl, 4-hexenyl, and the like, when alkenyl; cyclopropyl, cyclobutyl, cyclopentyl, cyclohexyl, and the like, when cycloalkyl; cyclopropylmethyl, cyclopropylethyl, cyclopentylmethyl, cyclohexylmethyl, cyclohexylethyl, and the like, when cycloalkylalkyl; 2-methylphenyl, 4-methylphenyl, 2,4-dimethylphenyl, 3-ethylphenyl, and the like, when alkylatedphenyl.

The halogenated-(lower alkanoyl) radical Ac has from two to four carbon atoms, and includes such examples as chloroacetyl (chloroethanoyl), iodoacetyl, fluoroacetyl, dichloroacetyl (dichloroethanoyl), dibromoacetyl, trichloroacetyl, 2-chloropropanoyl (alpha-chloropropionyl), 3-bromopropanoyl, 2,2-diiodopropanoyl, 2-bromo-3-chloropropanoyl, 2,2-dichloropropanoyl, 2,2-difluoropropanoyl, 2,2,3-trichloropropanoyl (alpha,alpha,beta-trichloropropionyl), 2-chlorobutanoyl (alpha-chlorobutyryl), 3-bromobutanoyl, 2,2-dichlorobutanoyl, 3,4-dibromobutanoyl, 2,2,3-trichlorobutanoyl, 2,3,4-trichlorobutanoyl, and the like.

The compounds of my U.S. Patent 2,776,991 were prepared by reacting an N-(2-carbamylalkyl)-aralkylamine of the formula, Ar—X—NH—Y—CONHR, with an acylating agent selected from the group consisting of those having the formulas, Ac-halogen and (Ac)$_2$O, where Ar, X, Y, R and Ac have the meanings given above. When a halogenated-alkanoyl halide, Ac-halogen, was used, the halide halogen, i.e., the halo radical attached to the carbonyl function, was preferably chloro, however, the other halo radicals, i.e., bromo, iodo and fluoro also can be used.

The N-(2-carbamylalkyl)-aralkylamines of this invention where R is hydrogen, i.e., Ar—X—NH—Y—CONH$_2$, were prepared by reacting an aralkylamine of the formula, Ar—X—NH$_2$, where Ar and X have the meanings given above, with a 2-alkenamide. This preparation was carried out, preferably, by: warming the reactants gently until solution was complete; allowing the reaction mixture to stand at room temperature from one to two weeks; dissolving the reaction mixture in an appropriate solvent, e.g., acetone; and treating the resulting solution with ethanolic hydrogen chloride to precipitate the N-(2-carbamylalkyl)-aralkylamine in the form of its hydrochloride. Illustrations of the preparation of these N-(2-carbamylalkyl)-aralkylamines, each in the form of its hydrochloride, are: the preparation of N-(2-carbamylethyl)-2,4-dichlorobenzylamine by reacting 2,4-dichlorobenzylamine with acrylamide; the preparation of N-(2-carbamylpropyl)-3,4,5-tribromobenzylamine by reacting 3,4,5-tribromobenzylamine with alpha-methylacrylamide; and the preparation of N-(2-carbamylbutyl)-4-nitrophenethylamine by reacting 4-nitrophenethylamine with alpha-ethylacrylamide.

The N-(2-carbamylalkyl)-aralkylamines where R is a hydrocarbyl radical, i.e., Ar—X—NH—Y—CONH—hydrocarbyl, were prepared by first reacting an aralkylamine of the formula, Ar—X—NH$_2$, where Ar and X have the meanings given above, with a lower alkyl ester (preferably the methyl ester) of a 2-alkenoic acid, and then reacting the resulting N-(2-carbalkoxyalkyl)-aralkylamine with a hydrocarbyl primary amine, RNH$_2$. Illustrations of this procedure are: the preparation of N-[2-(ethylcarbamyl)ethyl]-2,4-dichlorobenzylamine by first reacting 2,4-dichlorobenzylamine with methyl acrylate and then reacting the resulting N-(2-carbomethoxyethyl)-2,4-dichlorobenzylamine with ethylamine; the preparation of N-[2-(benzylcarbamyl)propyl]-4-n-butoxybenzylamine by first reacting 4-n-butoxybenzylamine with methyl alpha-methylacrylate and then reacting the resulting N-(2-carbomethoxypropyl)-4-n-butoxybenzylamine with benzylamine; the preparation of N-[2-(cyclohexylcarbamyl)butyl]-4-ethylmercaptophenethylamine by first reacting 4-ethylmercaptophenethylamine with methyl alpha-ethylacrylate and then reacting the resulting N-(2-carbomethoxybutyl)-4-ethylmercaptophenethylamine with cyclohexylamine.

Preferred embodiments of my invention of U.S. Patent 2,776,991 are those N-(substituted-phenylalkyl)-N-(2-carbamylalkyl)-halogenated-alkanamides having the formula

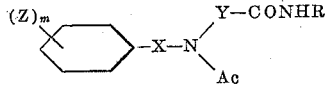

where X, Y, R and Ac have the meanings given above,

Z is halo or lower alkoxy as defined above, and m is an integer from 1 to 3 inclusive. These substituted-phenylalkyl compounds having from one to three halo and/or lower alkoxy ring-substituents have been found by chemotherapeutic evaluation to have especially high amebacidal activities.

Comprehended by the instant invention are the corresponding intermediate N-(2-carbamylalkyl)-(substituted-phenyl)alkylamines used to prepare my above-described preferred embodiments of said patent, these intermediates having the formula

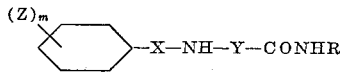

where X, Y, R, Z and m have the meanings given in the immediately preceding paragraph.

The following examples will further illustrate specific embodiments of the invention without, however, limiting it thereto.

EXAMPLE 1

N-(2-carbamylalkyl)-aralkylamines

The preparation of the intermediate N-(2-carbamylalkyl)-aralkylamines having the above formula where R is hydrogen is illustrated by the following preparation of N-(2-carbamylethyl)-4-chlorobenzylamine: A mixture of 28.3 g. of 4-chlorobenzylamine and 15.6 g. of acrylamide was warmed gently until solution was complete, and then left at room temperature for 7 days. The resulting solid was taken up in 400 ml. of acetone and 5 N ethanolic hydrogen chloride was added in 10 ml. portions. The precipitate was collected from each fraction before the following portion of acid was added. There was thus obtained two fractions weighing 15 g. and 9 g., respectively, which were combined and recrystallized twice from isopropanol, yielding the desired intermediate, N-(2-carbamylethyl)-4-chlorobenzylamine in the form of its hydrochloride, M.P. 220.1–221.2° C. (corr.).

*Analysis.*—Calcd. for $C_{10}H_{13}ClN_2O \cdot HCl$: $Cl^-$, 14.24; N, 11.25. Found: $Cl^-$, 14.33; N, 11.26.

Other N-(2-carbamylethyl)-aralkylamine hydrochlorides that were prepared following the procedure described above for the preparation of N-(2-carbamylethyl)-4-chlorobenzylamine hydrochloride using the appropriate aralkylamine and 2-alkenamide are given in Table I.

TABLE I

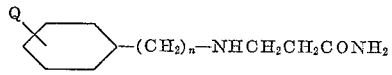

| Q | n | M.P., °C.[a] | Hydrochloride, M.P., °C. |
|---|---|---|---|
| H | 1 | 81–86 | 202–203. |
| 4-CH₃ | 1 | 98–103 | |
| 4-CH(CH₃)₂ | 1 | 69–72 | 217–218.8 (corr.). |
| 2,4-di-Cl | 1 | 65–75 | 164.5–166. |
| 4-OC₄H₉-n | 1 | 87–90 | 200–203. |
| 3,4-di-OCH₃ | 1 | | 218.9–220.8 (corr.). |
| 4-N(CH₃)₂ | 1 | (b) | |
| H | 2 | | 181.3–182.7 (corr.). |

[a] The free base form of these compounds was obtained by treating an aqueous solution of the hydrochloride with alkali, extracting the liberated base with benzene, removing the solvent by distilling in vacuo and recrystallizing the resulting N-(2-carbamylethyl)-aralkylamine from an appropriate solvent.
[b] This compound was used directly in the next step.

Other N-(2-carbamylalkyl)-aralkylamines are prepared according to the above procedure using the appropriate acrylamide or alkylated-acrylamide; such compounds include N-(2-carbamylethyl)-1-naphthylmethylamine, N-(2-carbamylethyl)-1-biphenylmethylamine, N-(2-carbamylethyl)-4-n-hexylbenzylamine, N-(2-carbamylethyl)-2,4-diiodobenzylamine, N-(2-carbamylethyl)-4-nitrophenethylamine, N-(2-carbamylpropyl)-1-(3,4,5-triethoxyphenyl)ethylamine, N-(2-carbamylpropyl)-4-(2,4-di-chlorophenyl)butylamine, N-(2-carbamylbutyl)-4-di-n-butylaminobenzylamine, N-(2-carbamylethyl)-4-n-hexoxybenzylamine, N-(2-carbamylethyl)-4-n-butylmercaptobenzylamine, N-(2-carbamylethyl)-4-n-butylsulfonylbenzylamine, N-(2-carbamylethyl)-4-nitrobenzylamine, N-(2-carbamylethyl)-2-furylmethylamine, N-(2-carbamylethyl)-2-thienylmethylamine, N-(2-carbamylethyl)-2-pyridylmethylamine, N-(2-carbamylethyl)-3-pyridylmethylamine, N-(2-carbamylpropyl)-5-chloro-2-pyridylmethylamine, and the like.

EXAMPLE 2

A. N-(2-carbalkoxyalkyl)-aralkylamines

The preparation of these intermediate N-(2-carbalkoxyalkyl)-aralkylamines is illustrated by the following preparation of N-(2-carbomethoxyethyl)-4-isopropylbenzylamine: To 43 g. of methyl acrylate was added 60 g. of 4-isopropylbenzylamine with stirring and occasional cooling, keeping the temperature below 35° C. The reaction mixture was then allowed to stand for one week at room temperature. The excess methyl acrylate was removed by distilling under reduced pressure and the residual material distilled in vacuo. The fraction boiling at 115–135° C. at 0.3 mm. was the desired product, N-(2-carbomethoxyethyl)-4-isopropylbenzylamine, $n_D^{25}$, 1.5030.

*Analysis.*—Calcd. for $C_{14}H_{21}NO_2$: $N_{AP}$, 5.95. Found: $N_{AP}$, 5.92.

Here $N_{AP}$ means basic nitrogen content as determined by acetic acid-perchloric acid titration.

Other N-(2-carbalkoxyalkyl)-aralkylamines that are prepared according to the above procedure are: N-(2-carbethoxyethyl)-2,4-dichlorobenzylamine, N-(2-carbomethoxypropyl)-4-n-butoxybenzylamine, N-(2-carbomethoxybutyl)-3,4-diethoxybenzylamine, N-(2-carbomethoxyethyl)-4-n-hexylbenzylamine, and the like.

B. N-[2-(hydrocarbyl-carbamyl)alkyl]-aralkylamines

The preparation of these intermediate compounds is illustrated by the following preparation of N-[2-(ethylcarbamyl)ethyl]-4-isopropylbenzylamine: A mixture of 23.5 g. of N-(2-carbomethoxyethyl)-4-isopropylbenzylamine, 45.1 g. of anhydrous ethylamine and 50 ml. of ethanol were left tightly stoppered at room temperature for five days. The solvent and excess ethylamine were removed by distilling under reduced pressure, and the resulting viscous red oil was distilled. The fraction boiling at 135–148° C. at 1 micron, $n_D^{25}$, 1.5204, was the desired product, N-[2-(ethylcarbamyl)ethyl]-4-isopropylbenzylamine.

*Analysis.*—Calcd. for $C_{15}H_{24}N_2O$: $N_{AP}$, 5.62. Found: $N_{AP}$, 5.64.

Following the above procedure but substituting for ethylamine, n-hexylamine, allylamine, cyclopentylamine, cyclohexylmethylamine, aniline, 3-ethylaniline, benzylamine or phenethylamine, and using the appropriate N-(2-carbalkoxyalkyl)-aralkylamine, the following products are obtained: N-[2-(n-hexylcarbamyl)ethyl]-4-isopropylbenzylamine, N-[2-(allylcarbamyl)ethyl]-2,4-dichlorobenzylamine, N-[2-(cyclopentylcarbamyl)propyl]-4-n-butoxybenzylamine, N-[2-(cyclohexylmethylcarbamyl)ethyl]-3,4-dibromobenzylamine, N-[2-(phenylcarbamyl)butyl]-4-chlorobenzylamine, N-[2-(3-ethylphenylcarbamyl)ethyl]-2-(3,4-diethoxyphenyl)ethylamine, N-[2-(benzylcarbamyl)ethyl]-2,4-dichlorobenzylamine or N-[2-(phenethylcarbamyl)ethyl]-4-nitrobenzylamine.

I claim:

1. A compound having the formula

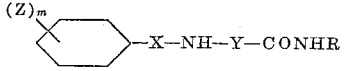

where Z is a member selected from the group consisting of halo and lower alkoxy, m is an integer from one to three inclusive, X is a lower alkylene radical having from one to four carbon atoms, Y is a lower alpha, beta-alkylene radical having from two to four carbon atoms and R is a member selected from the group consisting of hydrogen and an alkyl radical having from one to eight carbon atoms.

2. A compound having the formula

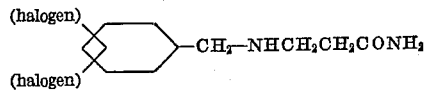

3. A compound having the formula

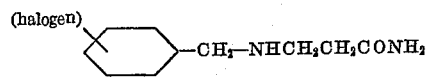

4. A compound having the formula

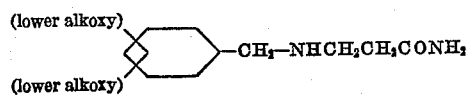

5. A compound having the formula

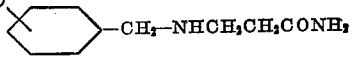

6. N-(2-carbamylethyl)-2,4-dichlorobenzylamine.

References Cited in the file of this patent

UNITED STATES PATENTS

| | | |
|---|---|---|
| 2,317,999 | Leuchs | May 4, 1943 |
| 2,441,498 | Lofgren et al. | May 11, 1948 |
| 2,768,202 | Goldberg et al. | Oct. 23, 1956 |
| 2,841,589 | Brandstrom et al. | July 1, 1958 |

FOREIGN PATENTS

| | | |
|---|---|---|
| 527,217 | Belgium | Sept. 13, 1952 |
| 586,645 | Great Britain | Mar. 26, 1947 |
| 587,244 | Great Britain | Apr. 18, 1947 |